(12) United States Patent
van Walraven et al.

(10) Patent No.: US 8,336,832 B2
(45) Date of Patent: Dec. 25, 2012

(54) FIRESTOP COLLAR

(75) Inventors: Jan van Walraven, Mijdrecht (NL); Jurgen Wied, Stadteil Ruckerhausen (DE)

(73) Assignees: J. Van Walraven Holding B.V., Mijdrecht (NL); Rolf Kuhn GmbH, Tutzing (DE)

( * ) Notice: Subject to any disclaimer, the term of this patent is extended or adjusted under 35 U.S.C. 154(b) by 235 days.

(21) Appl. No.: 12/753,182

(22) Filed: Apr. 2, 2010

(65) Prior Publication Data

US 2011/0210222 A1  Sep. 1, 2011

(30) Foreign Application Priority Data

Mar. 1, 2010 (NL) ...................................... 2004318

(51) Int. Cl.
*F16L 5/00* (2006.01)
(52) U.S. Cl. ........... 248/56; 248/74.3; 52/232; 52/220.8
(58) Field of Classification Search ............. 248/56, 248/74.3, 315, 539; 52/232, 317, 99, 220.8
See application file for complete search history.

(56) References Cited

U.S. PATENT DOCUMENTS

| | | | |
|---|---|---|---|
| 4,951,442 A | | 8/1990 | Harbeke, Jr. |
| 5,058,341 A | * | 10/1991 | Harbeke, Jr. ............. 52/232 |
| 5,103,609 A | * | 4/1992 | Thoreson et al. ............. 52/232 |
| 5,498,466 A | * | 3/1996 | Navarro et al. ............. 428/408 |
| 5,586,739 A | * | 12/1996 | Gantner et al. ............. 248/74.1 |
| 5,887,396 A | * | 3/1999 | Thoreson ............. 52/232 |
| 6,029,412 A | * | 2/2000 | Gohlke ............. 52/232 |
| 6,725,615 B1 | * | 4/2004 | Porter ............. 52/232 |
| 7,596,914 B2 | * | 10/2009 | Stahl et al. ............. 52/220.8 |
| 2007/0151183 A1 | | 7/2007 | Stahl, Sr. et al. |
| 2008/0313986 A1 | * | 12/2008 | Spais ............. 52/317 |

FOREIGN PATENT DOCUMENTS

| | | |
|---|---|---|
| DE | 202005018356 U1 | 3/2006 |
| EP | 0 486 299 A1 | 5/1992 |
| EP | 0 982 522 A2 | 3/2000 |
| EP | 1790895 | 5/2007 |
| WO | 0068608 A1 | 11/2000 |

OTHER PUBLICATIONS

Search Report dated Nov. 23, 2010 issued in Dutch patent application No. NL 2004318.

* cited by examiner

*Primary Examiner* — Bradley Duckworth
(74) *Attorney, Agent, or Firm* — Browdy and Neimark, P.L.L.C.

(57) ABSTRACT

A metal casing strip for a fire collar to be arranged around a duct has a line of successive tongues and cutouts in the longitudinal direction of the strip. The tongues and cutouts are arranged in the strip in an alternating fashion. The tongues are bendable out of the surface of the casing strip such that in use, when the casing strip is arranged around a pipe such that two end regions overlap, an outwardly bended tongue from the one end region is inserted in a cutout of the overlapping other end region and folded over the edge of the cutout to retain the casing strip in the closed collar shape.

17 Claims, 3 Drawing Sheets

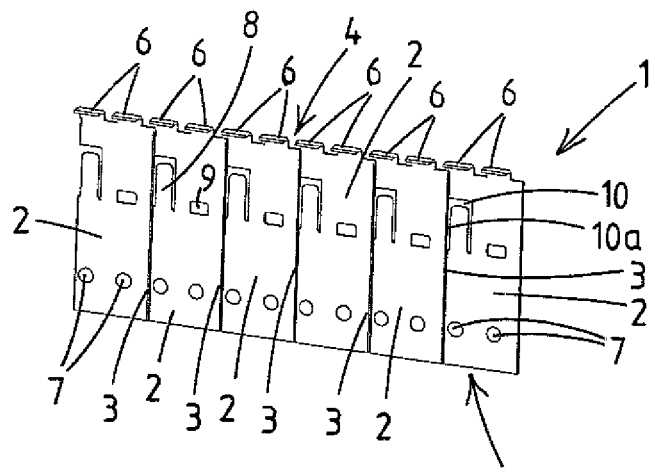
Fig.1
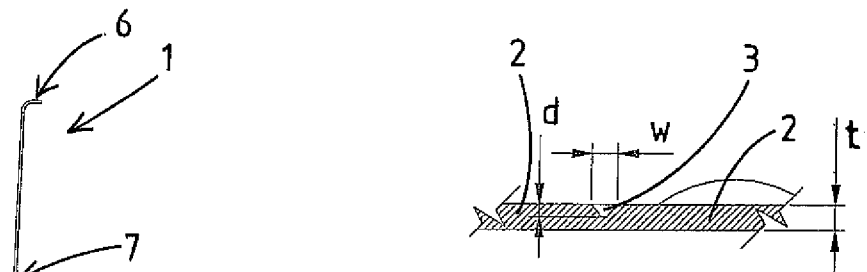
Fig.2
Fig.3
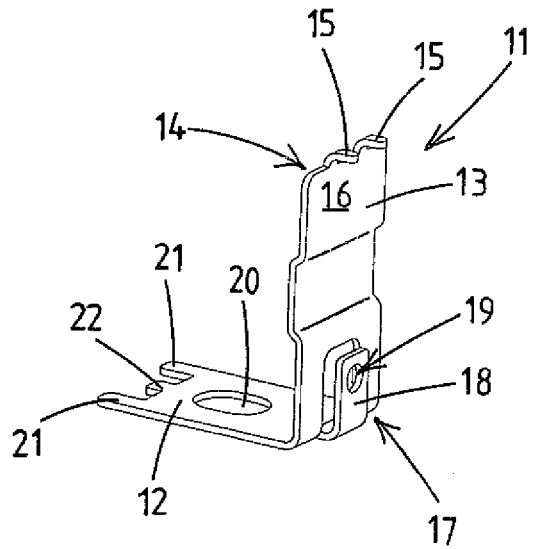
Fig.4

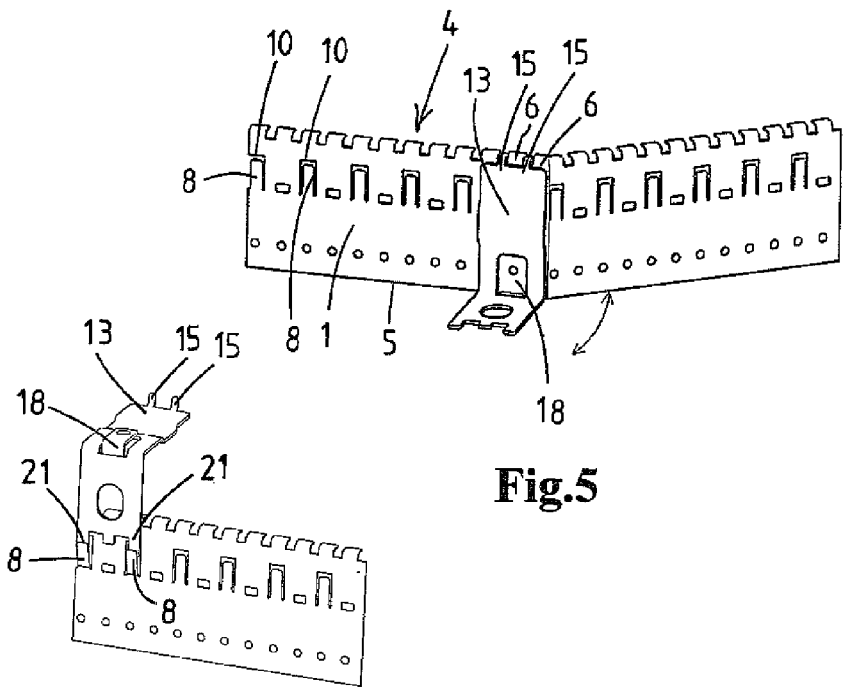
Fig.5
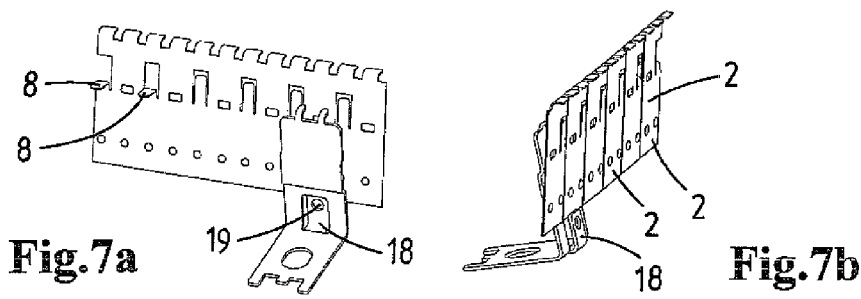
Fig.6
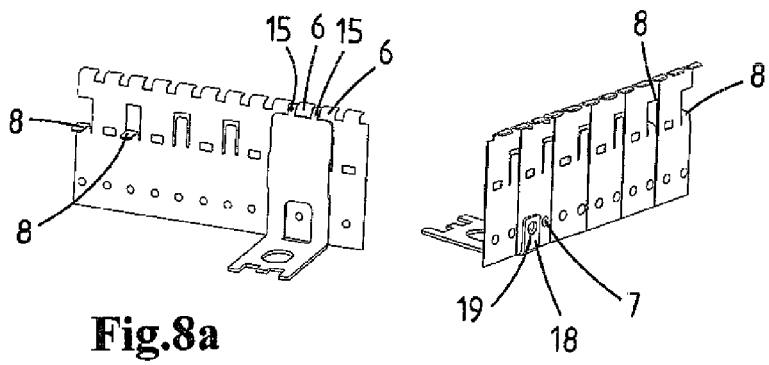
Fig.7a   Fig.7b
Fig.8a   Fig.8b

FIRESTOP COLLAR

FIELD OF THE INVENTION

The present invention relates to the field of fire collars. Fire collars are typically applied around pipes, cable ducts or other ducts which are passed through a support surface such as a wall, ceiling or the like. The collar includes a layer of intumescent material within a casing. In case of heat the intumescent material swells. The casing retains the swelling intumescent material and causes the intumescent to apply a pressure on the pipe or other duct. If the pipe or duct is of plastics material the pipe or duct may collide under the pressure of the swelling intumescent. If the pipe is made of metal the space around the pipe is filled with intumescent. Thereby the passage through the wall or ceiling is closed off effectively for heat and smoke. The collar can be fixed in position on the wall, by some suitable attachment means.

From the company 3M is known a Fire Barrier FS-195+ Strip/Wrap which is a strip of intumescent material which at the job site is cut to length by a fitter and then wrapped around a pipe or conduit From 3M is also known a metal casing strip under the name of Fire Barrier RC-1 Restricting Collar, which is also cut to length at the job site by the fitter and then wrapped around the intumescent strip already wrapped around the pipe. The metal casing is held in the closed state by a separate metal string laid around the casing. The metal casing strip RC-1 has attachment tabs on one longitudinal side, which attachment tabs are bended outwardly by the fitter such that the can be placed against a support surface. The attachment tabs each have a hole through which a screw can be inserted to attach the metal casing to the support surface. In U.S. Pat. No. 4,951,442 is disclosed a similar casing, but with a predetermined length In U.S. Pat. No. 5,103,609 is disclosed a fire collar which is adapted for a predetermined pipe diameter The fire stop collar has a casing and a intumescent layer attached thereto. The fire stop collar furthermore has brackets which are attached to a wall or the like and which are coupled to the casing by lips extending through an aperture in the brackets, which lips are folded so as to couple the bracket to the casing EP 982 522 A2 discloses a fire collar with a metal casing and brackets that are coupled to the casing and attached to a wall.

EP 1 181 481 discloses another fire collar, in which an intumescent layer is attached to a metal casing strip, e g by an adhesive. The fire collar has brackets which are coupled to the casing so as to attach the collar to a wall The present invention has for an object to provide an assembly for a fire collar which provides a more convenient use.

SUMMARY OF THE INVENTION

The object is achieved by a metal casing strip for a fire collar to be arranged around a pipe or other duct, wherein the casing strip has a line of successive tongues and cutouts in the longitudinal direction of the strip. The tongues and cutouts are arranged in the strip in an alternating fashion. The tongues are bendable out of the surface of the casing strip such that in use, when the casing strip is arranged around a pipe or other duct such that two end regions overlap, an outwardly bended tongue from the one end region is inserted in a cutout of the overlapping other end region and folded over the edge of the cutout to retain the casing strip in the closed collar shape The invention also relates to a combination of a metal casing strip for a fire collar to be arranged around a pipe or other duct and an attachment bracket for attaching the casing strip to a support surface The casing strip has a line of successive tongues and cutouts in the longitudinal direction of the strip, which tongues and cutouts are arranged in the strip in an alternating fashion The tongues are bendable out of the surface of the casing strip such that in use, when the casing strip is arranged around a pipe or other duct such that two end regions overlap, an outwardly bended tongue from the one end region is inserted in a cutout of the overlapping other end region and folded over the edge of the cutout to retain the casing strip in the closed collar shape Above the free end of the tongue is a clearance space and the bracket has an end edge with at least one tooth provided on it, which tooth is insertable through the clearance space, such that the tooth engages behind the tongue, whereby, when the bracket is moved downwards, the tongue is bended out of the surface of the casing strip.

The casing strip according to the invention allows for an easy wrapping around a pipe or other duct and securing it in the wrapped state without the need for additional parts to keep the collar closed.

Another aspect of the invention relates to a combination of a metal casing strip for a fire stop collar and an attachment bracket for attaching the casing strip to a support surface, said metal casing strip having successive segments with a weakening line between successive segments, which metal casing strip in use is severed at a weakening line to bring the casing strip to the desired length to allow it to be wrapped around a pipe or other duct, said bracket having a side edge as well as holding and positioning means for holding the strip, wherein the side edge of the bracket is positioned over one of the weakening lines and the strip can be bended and broken along said side edge of the bracket when in use the positioning means of the bracket are in cooperation with the positioning means of the casing.

The bracket according to the invention is used as a tool to brake off the casing strip at the desired length for wrapping around a duct.

Preferred embodiments of the invention are defined by the dependent claims.

The invention will be described in more detail in the following description with reference to the drawings

BRIEF DESCRIPTION OF THE DRAWINGS

FIG. 1 shows a view in perspective of a part of a casing strip according to the invention;

FIG. 2 shows a side view of the casing strip of FIG. 1;

FIG. 3 shows a sectional view of the casing strip of FIG. 1 at the location of a weakening line;

FIG. 4 shows in a perspective view an attachment bracket to attach the casing strip of FIG. 1 to a support surface;

FIG. 5 illustrates the use of the bracket of FIG. 4 as a tool for severing the strip of FIG. 1 to the desired length;

FIG. 6 illustrates the use of the bracket of FIG. 4 as a tool for bending tongues in the strip outwardly;

FIG. 7a and FIG. 7b show in different views in perspective how the bracket of FIG. 4 is assembled with the casing strip of FIG. 1;

FIG. 8a and FIG. 8b show in different views in perspective how the bracket of FIG. 4 is assembled with the casing strip of FIG. 1;

DETAILED DESCRIPTION OF THE INVENTION

Figure 9:
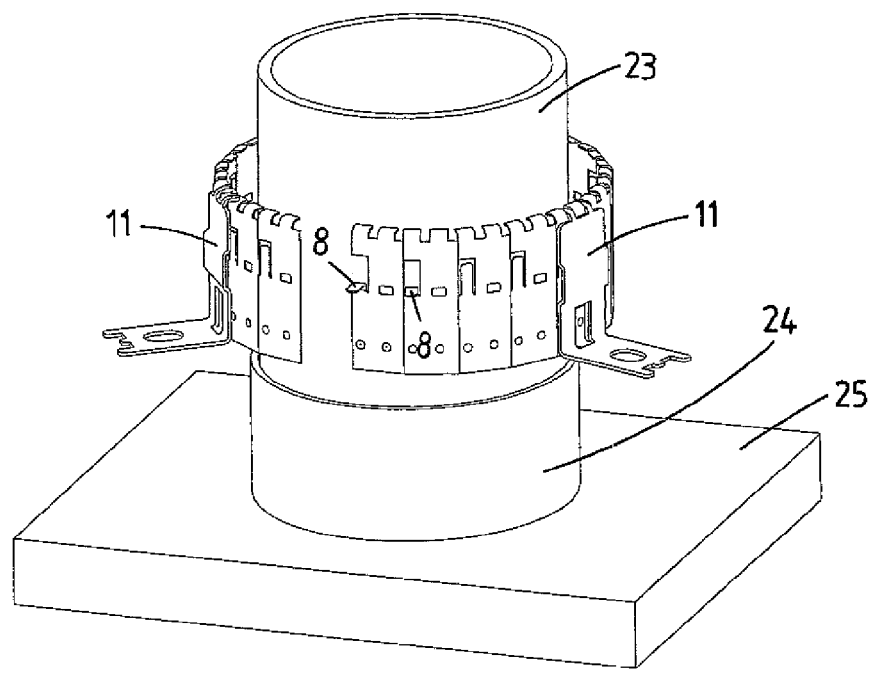
FIG. 9 illustrates how the assembled combination of FIG. 8 is wrapped around a pipe.

In FIG. 1 is shown a length of a metal casing strip 1 for forming a casing for a fire collar. The casing strip 1 is preferably made of steel with a thickness of for example 0.5 mm and is generally flat as can be seen in FIG. 2.

The casing strip 1 comprises successive strip segments 2. Between the strip segments 2, a weakening line 3 is provided which allows the casing strip 2 to be severed at a desired length. The weakening line 3 is preferably formed by a groove in the strip material as is shown in FIG. 3. The weakening line in FIG. 3 is a generally V-shaped groove with a depth d which is approximately half of the thickness of the strip, thus for example 0.25 mm. The width w of the groove at the surface of the strip 1 is for example corresponding to the thickness t of the strip 1.

The strip 1 has an upper longitudinal edge 4 which in use is remote from a support surface (see FIG. 10) and a lower longitudinal edge 5 which in use faces the support surface.

At the upper edge 4 inwardly bended tabs 6 are formed, the function of which will become clear below. Each segment 2 has two spaced apart inwardly bended tabs 6. However, there may be also another number of bended tabs 6.

At a distance from the lower edge 5 a line positioning protrusions 7 is formed. The positioning protrusions 7 are formed as bulges as is best visible in the side view of FIG. 2. Each segment has preferably two positioning protrusions 7 as is shown, but may also have another number of positioning protrusions.

The casing strip 1 has between the upper edge 4 and the line of positioning protrusions 7 a line of regularly spaced apart tongues 8 and regularly spaced apart holes 9. The tongues 8 and the holes 9 are arranged alternately in the line In the preferred embodiment shown in the figures, the tongues 8 have an inverted U-shaped cutout 10 around them. Each tongue 8 is positioned such that one of the legs 10a of the U-shaped cutout is adjacent a weakening line 3. The tongues 8 are thus attached only at their lower end and can be bended out of the generally flat surface of the casing strip 1.

The holes 9 have a width which is slightly greater than the width of the tongues 8.

In FIG. 4 is shown an attachment bracket 11 which is adapted to cooperate with a casing strip 1 as is described above.

The bracket 11 is made of a metal strip bended to generally an L-shape with a first leg 12 and a second leg 13. The first leg 12 engages on a support surface when mounted (see FIG. 10). The second leg 13 engages in the mounted state on the outer side of the casing strip 1 (see FIG. 10).

The second leg 13 has an upper end 14 where two hook members 15 are arranged which extend transversely with respect to an inner leg surface 16.

At a lower end 17 of the second leg 13 a lug 18 is bended out of the surface 16 of the second leg 13. The lug 18 extends substantially parallel to the inner leg surface 16 of the second leg 13, at a distance which substantially corresponds to the thickness of the casing strip 1, thus for example about 0.5 mm. The lug 18 is located in the middle of the leg 13 seen in the width direction of the leg 13.

In the lug 18 is provided a recess, preferably a hole 19 as is shown in FIG. 4. The hole 19 is located at a height such that when a casing strip 1 with its lower region is inserted between the lug 18 and the inner surface 16 of the second leg (see FIGS. 7 and 8), the protrusions 7 are at the same height as the hole 19. The hole 19 has a diameter such that a positioning protrusion 7 fits in it. This will be elucidated further below.

Figure 10:
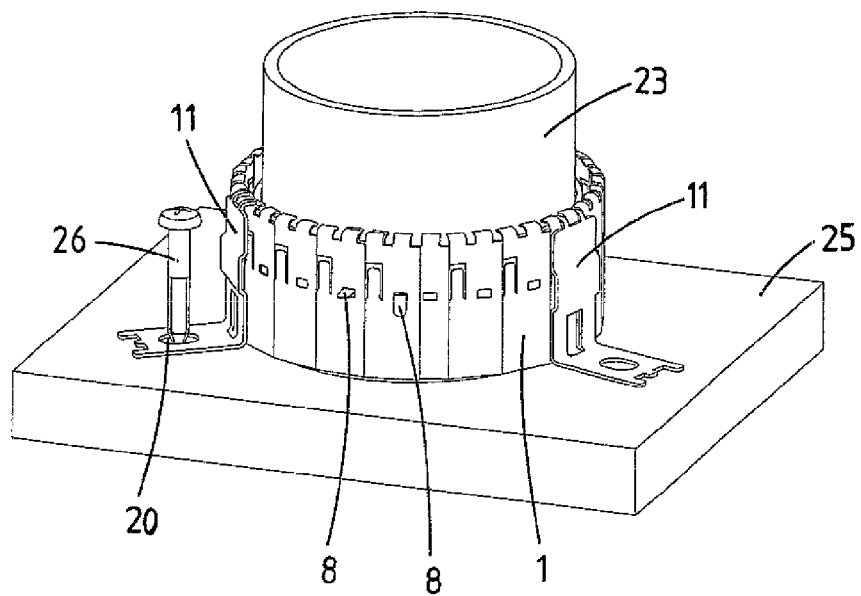
FIG. 10 shows how the assembled combination of FIG. 9 is mounted around the pipe and attached to a support surface.

The first leg 12 has a hole 20 in it for passing through an attachment element such as a screw such that the bracket can be attached to a support surface (see FIG. 10). The hole 20 has an oblong shape to allow for mounting flexibility The first leg 12 of the bracket 11 has a free end which is provided with three teeth 21, 22 The two outer teeth 21 are longer than the middle tooth 22. The mutual distance between the outer teeth 21 corresponds with the mutual distance between the bendable tongues 8 The width and the thickness of the outer teeth 21 is such that it can be inserted in the portion of the cutout 10 above the tongues 8 as will be described further on in the description.

The use of the above described casing strip 1 and accompanying bracket 11 will be described below with reference to FIGS. 5-10.

A fire collar is commonly mounted around a pipe or another duct which extends through a passage in a wall, ceiling or floor. The fire collar abuts the wall, the floor or the ceiling such that when in case of a fire or extreme heat, the intumescent material swells and closes of the passage through the wall, floor or ceiling. When a fitter is mounting a fire collar around a pipe, he will first wrap a layer of intumescent material around the pipe. In FIG. 9 the pipe is indicated with reference numeral 23 and the layer of intumescent material is indicated with reference numeral 24. The intumescent layer 24 is arranged to abut the surface of the support surface 25, i.e. a wall, floor or ceiling.

After the intumescent layer has been applied around the pipe, the casing can be arranged around the intumescent. The casing is formed by wrapping a length of casing strip around the intumescent material.

The casing strip 1 is preferably delivered on a roll. A suitable length of strip can be cut such that it fits around the intumescent layer 24. In FIG. 5 it is shown how the strip 1 can be brought to the desired length. The bracket 11 is positioned with its inner surface 16 against the outer surface of the casing strip 1. Thereto the lug 18 is moved beyond the lower edge 5 of the strip 1 and moved upwards such that the lug 18 grips behind the edge 5 as is shown in FIGS. 7a and 7b. The bracket is then moved upwards until the lug with an upper edge thereof engages a protrusion 7. The lug 18 is resiliently deformed away from the second leg until the protrusion 7 snaps into the hole 19 of the lug 18. At the same time the hook members 15 on the upper end of the second leg 13 of the bracket 11 engage in the intermediate spaces between the inwardly bended tabs 6 on the upper end 4 of the casing strip 1 as is shown in FIG. 5. The bracket 11 is now attached to the strip 1.

Each strip segment 2 has two protrusions 7. When, in FIG. 5 the left protrusion 7 (seen from the outer side of the casing strip 1) of a segment 2 is located in the hole 19 in the lug 18, the right side edge of the second leg 13 lies over the right weakening line 3 of that same segment 2. The fitter can hold the bracket at the first leg 12 with one hand and move the strip portion right thereof here and forth with the other hand Thereby the strip 1 will brake at the weakening line 3 along the side edge of the second leg 13 of the bracket 11

After the casing strip 1 has been brought to the desired length, the bracket 13 is released from the casing strip 1 again. Next, the two outer teeth 21 on the first leg 12 of the bracket 11 can be inserted in the portion of the cutout 10 above the tongues 8 of the outermost two segments 2 at one of the strip ends. Then the bracket 11 can be swiveled upwards to a position as is shown in FIG. 6 such that the teeth 21 engage behind the tongues 8. Next, the bracket 11 can be swiveled downwardly such that the tongues 8 are bent outwardly to a position which is best visible in FIG. 7a. The central tooth 22 functions as a support point around which the swiveling takes place during this movement.

Now the bracket 11 can be released again from the cut-outs 10 and be arranged in a mounting position on the casing strip 1. Thereto the lug 18 is moved again beyond the lower edge 5 of the strip 1 and moved upwards such that the lug 18 grips behind the edge 5 as is shown in FIGS. 7a and 7b The bracket 11 is then moved upwards until the lug with an upper edge thereof engages a protrusion 7. This time the protrusion 7 on the right (seen from the outer side) of the segment 2 is engaged. The lug 18 is resiliently deformed away from the second leg 13 until the protrusion 7 snaps into the hole 19 of the lug 18. At the same time the hook members 15 on the upper end of the second leg 13 of the bracket 11 engage in the intermediate spaces between the inwardly bended tabs 6 on the upper end 4 of the casing strip 1 as is shown in FIG. 5. The bracket 11 is now attached to the strip 1. In this way a plurality of brackets 11, for example three, can be attached to the casing strip 1

The assembly of the casing strip 1 with the attachment brackets 11 can now be arranged around the intumescent layer 24 wrapped around the pipe 23 as is illustrated in FIG. 9 The casing strip 1 is brought into abutment with the support surface 25. The casing is closed by bringing the end regions of the strip towards each other such that the end regions overlap. The outwardly bended tongues 8 at one end of the casing strip 1 are inserted in the openings 9 of the overlapping opposite end region of the strip (see FIG. 10 left tongue 8), after which the tongues 8 are bended downwardly over the edge of the hole 9 (see FIG. 10 right tongue 8) to retain the casing in the closed state.

The brackets 11 can now be attached to the support surface 25 by means of screws 26 which are passed through the holes 20 in the first legs 12 of the brackets 11, as is illustrated in FIG. 10. Thereby the fire collar is retained in position around the pipe 23 against the support surface 25.

What is claimed is:

1. A metal casing strip for a fire collar to be arranged around a pipe or other duct, wherein the casing strip has a line of successive tongues and cutouts in a longitudinal direction of the strip, which tongues and cutouts are arranged in the strip in an alternating fashion, wherein the tongues are bendable out of a surface of the casing strip such that in use, when the casing strip is arranged around a pipe or other duct such that two end regions overlap, an outwardly bended tongue from one of the two end regions is inserted in a cutout of an overlapping other on of the two end regions and folded over an edge of the cutout to retain the casing strip in a closed collar shape.

2. The metal casing strip according to claim 1, wherein the casing strip is adapted to cooperate with an attachment bracket to attach the casing strip to a support surface, the casing strip having a longitudinal lower edge, which in use faces the support surface, wherein a line of positioning protrusions extending in the longitudinal direction of the strip is provided in a region in proximity of the lower edge, said positioning protrusions adapted to cooperate with positioning means on the bracket.

3. The metal casing strip according to claim 1, wherein the metal casing strip has successive segments with a weakening line between successive segments, which metal casing strip in use is severed at a weakening line to bring the casing strip to the desired length to allow the casing strip be wrapped around a duct.

4. The metal casing strip according to claim 1, wherein the casing strip is provided on a roll.

5. A combination of a metal casing strip for a fire collar to be arranged around a pipe or other duct and an attachment bracket for attaching the casing strip to a support surface, wherein the casing strip has a line of successive tongues and cutouts in a longitudinal direction of the strip, which tongues and cutouts are arranged in the strip in an alternating fashion, wherein the tongues are bendable out of a surface of the casing strip such that in use, when the casing strip is arranged around a pipe or other duct such that two end regions overlap, an outwardly bended tongue from one of the two end regions is inserted in a cutout of an overlapping other one of the two end regions and folded over the edge of a cutout to retain the casing strip in a closed collar shape, wherein above a free end of the tongue is a clearance space and wherein the bracket has an end edge with at least one tooth provided the end edge, the at least one tooth being insertable through the clearance space, such that the at least one tooth engages behind the tongue, whereby, when the bracket is moved downwards, the tongue is bended out of a surface of the casing strip.

6. A combination of a metal casing strip for a fire stop collar and an attachment bracket for attaching the casing strip to a support surface, said metal casing strip having successive segments with a weakening line between successive segments, which metal casing strip in use is severed at a weakening line to bring the casing strip to a desired length to allow the casing strip to be wrapped around a pipe or other duct, and said casing strip having positioning means, said bracket having a side edge as well as holding and positioning means configured to hold the casing strip, wherein a side edge of the bracket is positioned over one of the weakening lines and wherein when in use the positioning means of the bracket are in cooperation with the positioning means of the casing, wherein the bracket has a general L-shape, comprising a first leg, which, in the mounted state, engages the support surface, and a second leg, which, in use is positioned on the outer side of the casing, wherein the casing strip has a lower longitudinal edge, which in use is turned to the support surface, wherein the holding and positioning means of the bracket comprise a lug spaced apart from the second leg, which in use engages around the lower edge of the casing strip and is positioned on the inner side of the casing.

7. The combination according to claim 6, wherein, seen in the width direction of the bracket, the lug is located in the middle of the bracket.

8. The combination according to claim 6, wherein the lug is formed as a tongue punched from the second leg.

9. The combination according to claim 6, wherein the lug has a positioning recess provided in it and wherein the strip of casing material has positioning protrusions on the inner side thereof, wherein the recess in the lug is adapted to receive one of the protrusions, wherein, when one of the protrusions in the strip is received in the recess in the lug, the side edge of the second leg is located at a weakening line in the strip, such that the strip can be bended and broken along the edge of the second leg.

10. The combination according to claim 6, wherein the casing strip has an upper longitudinal edge, which in use is remote from the support surface, wherein at said upper edge inwardly bended tabs are provided, which tabs in use retain intumescent material within the casing.

11. The combination according to claim 10, wherein the bracket at an end thereof which in a mounted state is remote from the support surface, and the holding and positioning means of the bracket is formed as one or more inwardly extending hook members which are dimensioned to engage in the mounted state in an intermediate space between the inwardly bended tabs.

12. The combination according to claim 6, wherein the casing strip has a line of successive tongues and cutouts in a longitudinal direction of the strip, which tongues and cutouts are arranged in the strip in an alternating fashion, wherein the tongues are bendable out of a surface of the casing strip to allow in use, when the casing strip is arranged around a pipe such that two end regions overlap, and a tongue is bended outwardly from one of the two end regions and is inserted in a cutout of an overlapping other one of the end regions and folded over an edge of the cutout to retain the casing strip in the closed collar shape.

13. The combination according to claim 12, wherein in each segment one tongue and one cutout is provided.

14. The combination according to claim 12, wherein above a free end of the tongue is a clearance space and wherein the bracket has an end edge with at least one tooth provided on it, the at least one tooth being insertable through the clearance space, such that the at least one tooth engages behind the tongue, whereby when the bracket is moved downwards the tongue is bended out of a surface of the casing strip.

15. The combination according to claim 14, wherein the bracket has two teeth which are each insertable through the clearance space at two successive tongues.

16. The combination according to claim 15, wherein the bracket between said two teeth has an intermediate tooth with a smaller length than said two teeth.

17. The combination according to claim 6, wherein the weakening line is defined by a groove in the casing strip.

* * * * *